United States Patent

Barrett

[15] 3,695,010
[45] Oct. 3, 1972

[54] TANK VENTING SYSTEM

[72] Inventor: James R. Barrett, Novato, Calif.
[73] Assignee: Fiberglass Structures
[22] Filed: Aug. 28, 1970
[21] Appl. No.: 67,797

[52] U.S. Cl. ...................55/385, 55/418, 137/192, 137/209
[51] Int. Cl. ...........................B01d 19/00
[58] Field of Search.................55/182, 310–314, 55/385, 418–420; 137/192, 209; 138/42, 43, 46

[56] References Cited

UNITED STATES PATENTS

| | | | |
|---|---|---|---|
| 748,727 | 1/1904 | Hanson | 137/209 |
| 1,962,360 | 6/1934 | Pflugheber | 137/192 |
| 2,160,501 | 5/1939 | Hedges et al. | 137/209 |
| 3,048,958 | 8/1962 | Barnes | 55/387 |

*Primary Examiner*—Bernard Nozick
*Attorney*—Eckhoff and Hoppe

[57] ABSTRACT

The present invention relates to a system for transferring a noxious liquid such as any of the mineral acids from a source of supply under air pressure to a tank and for removing the noxious gas from the tank as the tank is filled. The gas is scrubbed to permit release of the air displaced from the tank to the atmosphere free of any noxious components. The inlet line to the tank includes valve means permitting the free flow of liquid to the tank only as long as the liquid being reduced so that air is present, a valve in the valve means seats on the outlet from the valve means to permit only a small quantity of air to pass into the tank until the air pressure on the source of supply has been relieved, the released air being passed through the scrubber.

2 Claims, 4 Drawing Figures

PATENTED OCT 3 1972

3,695,010

INVENTOR.
JAMES R. BARRETT
BY
ATTORNEYS

TANK VENTING SYSTEM

BACKGROUND OF THE INVENTION

It has been the practice heretofore to transfer noxious liquids under air pressure into a tank. Unless the operator supervising the transfer cut off the air supply when no more liquid was available for transfer, it frequently happened that upon the flow of the liquid being diminished or stopped, the full air pressure was placed on the tank and frequently failure of the tank would occur. In addition, the transfer under air pressure to a tank in the manner described resulted in the release of the air to the atmosphere. This air necessarily carried vaporized components from the noxious liquid being transferred. Such release of noxious components to the atmosphere, of course, is highly objectionable and is subject to regulation by various governmental bodies.

SUMMARY OF THE INVENTION

It is in general the broad object of the invention to provide a novel system for the transfer of noxious liquids whereby the release of any noxious component to the atmosphere is obviated.

A further object of the present invention is to provide a system including a novel valve means which is effective to prevent the application of the full air pressure to a tank whereby the tank is protected against excessive pressure which might otherwise result in tank failure.

DESCRIPTION OF THE PREFERRED EMBODIMENT

Figure 1:
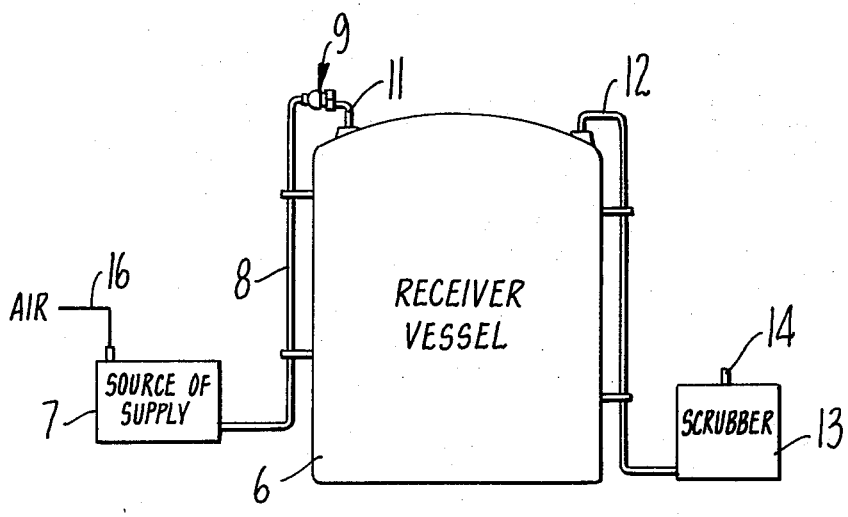
FIG. 1 is a schematic view showing the system of the present invention.

Referring to the drawings, I have shown a receiving vessel or tank 6 for holding the noxious liquid. Such a vessel can be made of glass fiber reinforced plastic, for example, because this is quite resistant to corrosion by a majority of such materials. The source of supply indicated at 7 can be a railway tank car, a tank truck or other suitable source of supply. The supply source is connected by inlet line 8 to the tank 6 through a valve means, generally indicated at 9, and which valve means will presently be described in detail. Usually the valve means is connected by an inlet line 11 to an upper portion of the tank which provides a vapor space. Air and any volatile components liberated from the liquid in the tank are removed through line 12 to a suitable scrubber 13 from which clean scrubbed air is released to the atmosphere through outlet 14. In practice, air under pressure is supplied from a source 16 to the source of supply 7 to force the noxious liquid through line 8 into the tank 6.

Figure 2:
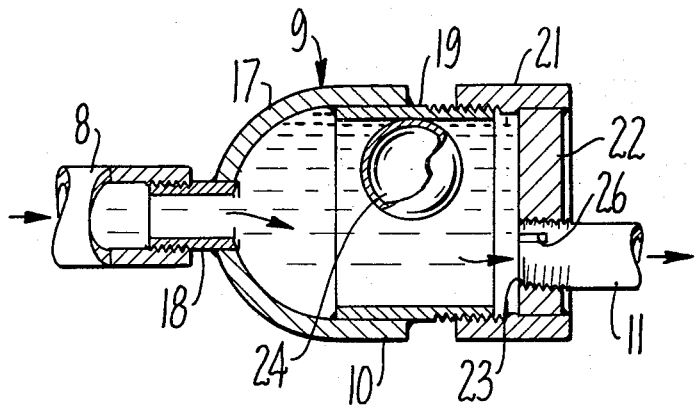
FIG. 2 is a side elevation of the novel valve means utilized showing the valve in operation with a full flow of the noxious liquid.
Figure 3:
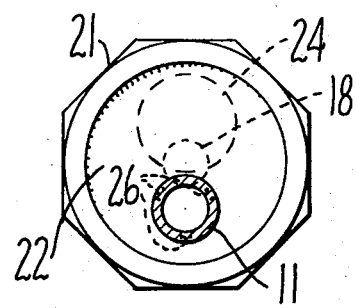
FIG. 3 is an end elevation of the valve mechanism shown in FIG. 2.
Figure 4:
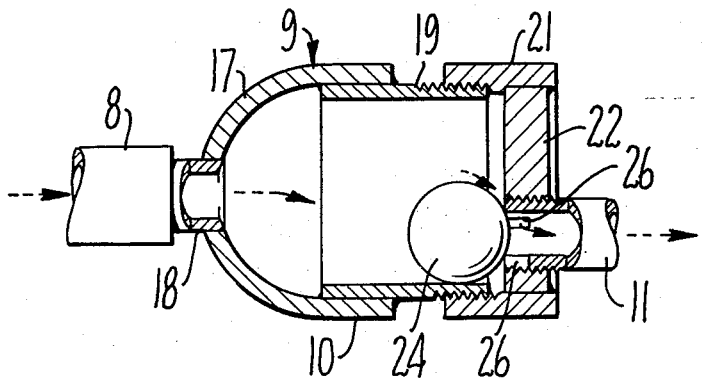
FIG. 4 is a view similar to FIG. 2 but illustrating the position of the valve when the flow of liquid has so diminished that the valve seats upon the outlet from the valve means.

The valve means 9, as shown particularly in FIGS. 2 and 3, includes a casing 10 made up of an end cap 17 having an inlet 18 about midway of its height. The end cap is joined by a short pipe section 19 to a threaded nipple 21, the latter being closed by a plate 22. Pipe 23 is connected to the interior of the valve casing at a lower portion of the valve casing and includes a valve seat, generally indicated at 23. Provided within the valve casing is a ball 24 of such size and density that it floats freely in the fluid passing through the valve 9. In accordance with this invention, the valve seat 23 is provided with several narrow slots 26 spaced about the seat, the utility of which will be presently explained.

When the liquid is flowing freely to the tank 6 from the source of supply, the valve casing is filled with liquid and the ball floats at the top of the chamber as appears in FIG. 2. However, when the flow of liquid diminishes, the ball falls with the level of the liquid in the valve casing and quickly comes to rest on valve seat 23. It is at this point that the possible danger to tank 6 exists. By providing the valve seat 23 with several narrow slots and by having the ball fit over the entrance to the outlet pipe 11, the full application of pressure from the air source 16 to the tank 6 is prevented because the ball fits over the entrance to the outlet pipe 11 and the only air that can pass the ball is that permitted by the several narrow slots 26. As a result, the pressure from the air source can be released safely and slowly while the source of supply is vented so as to be free of noxious vapors, these being removed as the air continues to pass from the source of air supply to the scrubber until the pressure on the entire system is at atmospheric pressure.

I claim:

1. Means for transferring a noxious liquid from a supply means to a receiving vessel comprising:
   a. a supply means;
   b. a receiving vessel;
   c. a gas scrubber for purifying gas ejected from the receiving vessel during its filling;
   d. a first conduit means connecting the supply means with the receiving vessel;
   e. a second conduit means connecting the receiving vessel with the gas scrubber;
   f. means connected to the supply means for supplying gas under pressure to the supply means to force the liquid from the supply means through the first conduit means into the receiving vessel; and
   g. valve means connected in the first conduit means and having inlet and outlet ports and a valve element therebetween permitting the free flow of liquid from the first conduit into the receiving vessel under full liquid flow conditions, and means including the valve element for restricting the flow of gas into the receiving vessel upon cessation of the flow of liquid.

2. The transfer means of claim 1, wherein said valve means has a horizontally extending casing, the casing including an inlet provided in an upper portion of the casing and an outlet provided in a lower portion of the casing, a hollow ball within the casing normally supported by fluid in the casing in an upper portion of the casing, the ball being adapted to fit over the outlet from the casing, the outlet from the casing being relieved by several narrow slots to permit gas to pass at a low rate between the ball and the outlet.

* * * * *